(12) United States Patent
Budden et al.

(10) Patent No.: US 11,747,530 B2
(45) Date of Patent: Sep. 5, 2023

(54) OPTICAL BAFFLE FOR A LASER SENSOR FOR DETERMINING A LIQUID LEVEL

(71) Applicants: Laser Technology, Inc., Centennial, CO (US); Kama-Tech (HK) Limited, Hong Kong (HK)

(72) Inventors: John Robert Budden, Thornton, CO (US); Jeremy G. Dunne, Parker, CO (US)

(73) Assignees: Laser Technology, Inc., Centennial, CO (US); Kama-Tech (HK) Limited, Hong Kong (HK)

( * ) Notice: Subject to any disclaimer, the term of this patent is extended or adjusted under 35 U.S.C. 154(b) by 169 days.

(21) Appl. No.: 17/341,831

(22) Filed: Jun. 8, 2021

(65) Prior Publication Data

US 2022/0390655 A1    Dec. 8, 2022

(51) Int. Cl.
*G01F 23/292* (2006.01)
*G02B 5/20* (2006.01)

(52) U.S. Cl.
CPC ........... *G02B 5/20* (2013.01); *G01F 23/2921* (2013.01)

(58) Field of Classification Search
CPC ........ G01N 1/10; G01N 21/552; G01N 21/85; G01F 23/00; G01F 23/28; G01F 23/29; G02B 5/20; G02B 6/00; G02B 6/24
USPC ..................................... 250/221, 559.4, 239
See application file for complete search history.

(56) References Cited

U.S. PATENT DOCUMENTS

2012/0138824 A1*  6/2012  Wen .................... G01F 23/2927
                                                                  250/575

* cited by examiner

*Primary Examiner* — Que Tan Le
(74) *Attorney, Agent, or Firm* — William J. Kubida; HOGAN LOVELLS US LLP (57) ABSTRACT

An optical baffle and combination with a laser sensor of especial applicability in attenuating off-axis laser light in the use of a laser sensor for determining the height of a liquid level or distance to a surface detectable through a pipe.

22 Claims, 7 Drawing Sheets

OPTICAL BAFFLE FOR A LASER SENSOR FOR DETERMINING A LIQUID LEVEL

BACKGROUND OF THE INVENTION

The present invention relates, in general, to the field of laser sensor devices. More particularly, the present invention relates to an optical baffle for a laser sensor of especial applicability in the use of a laser sensor for determining the height of a liquid level.

Laser sensors, such as the S3xx series devices available from Laser Technology, Inc., assignee of the present invention, utilize infrared laser light to measure distance. This eye-safe and invisible laser light is emitted from the transmit lens of the sensor, reflects off the liquid surface and returns to the receive lens of the sensor. The exact distance to the liquid surface is then calculated by comparing the emission and return time to the speed-of-light constant (Time of Flight).

The ability of a laser sensor to measure to a liquid surface is dependent upon the liquid's reflectance as well as the angle of incidence of the laser light. The reflectance of a liquid is determined by the refractive index of the liquid in relationship to the reflection angle of the laser light. For example, a smooth liquid surface with the laser normal to the angle of incidence is inherently more reflective than a turbulent surface where the angle of incidence varies from moment to moment.

The S3xx series of laser sensors are highly-sensitive precision laser-based devices and can accurately measure to liquid surfaces within their range specification. This includes penetrating through light steam or fog utilizing its last target mode. A general rule of thumb when measuring through steam or fog is if you can visually see the target, the sensor likely can as well. The human eye sees in the visible light spectrum whereas the Laser Technology, Inc. laser sensors utilize an infrared (IR) signal with a wavelength of 905 nm. As such, certain objects will appear differently in the visible spectrum compared to the 905 nm wave length, which is why the human eye test is only a general rule of thumb and not an absolute test of what the laser sensor is able penetrate through to the liquid surface.

Despite the incredible accuracy of these laser sensors in their own right, it has been determined that the accuracy of the devices can be further improved through their combination with one or more optical baffle tubes in accordance with the disclosure of the present invention.

SUMMARY OF THE INVENTION

As hereinafter disclosed, the baffle tubes serve to substantially eliminate laser light scatter caused by the lens elements of the transmit (TX) and receive (RX) lenses. Without the baffle tubes of the present invention, the off-axis light scatter can reflect off the internal diameter of, for example, the stilling or by-pass pipes in a liquid holding tank and ultimately reach the laser sensor receiver resulting in false early returns. Should enough of such early return signals occur, the laser sensor might mistakenly identify the reflected signals as the desired target level distance.

In a representative implementation of an optical baffle tube in accordance with the principles of the present invention, a tube of 3 inches in length having an internal dimension of substantially 0.720 inches of spaced-apart, concentric angular edged rings has proven very effective in blocking off-axis light scatter in conjunction with a laser sensor.

In operation, the baffle tubes of the present invention were utilized in conjunction with a Laser Technology, Inc. S3xx series laser sensor to measure water through a continuous 4 inch diameter white polyvinyl chloride (PVC) pipe. Such PVC pipes are industry standard for use as a stilling well in tank and open waterway level management. Stilling pipes are utilized to mitigate debris, foam, fog, steam and/or turbulent liquid surfaces from interfering in level measurement.

When 3 inch baffle tubes were tested in a 4 inch diameter PVC tube of 6 feet in length, on the transmit lens alone and on both the transmit and receive lenses of the laser sensor, the latter configuration produced the least amount of range error. In practice, utilizing a baffle tube on both lenses proved to be an extremely viable mechanical solution for stilling pipes with 4 inch internal diameters to at least 15 to 20 feet or longer while maintaining an accuracy of +/−½ inch with the liquid level at greater than 3 feet from the laser sensor.

Particularly disclosed herein is a sensing system for determining a liquid level which comprises a laser sensor having laser signal transmission and reception lenses thereof and operative to measure a time-of-flight distance of laser light between the laser sensor and the liquid level. A first optical baffle tube is positioned adjacent either one of the laser signal transmission and reception lenses, with the first optical baffle tube having a plurality of internal baffle rings operative to attenuate off-axis laser light emitted or received respectively from either one of the laser signal transmission or reception lenses.

In a more particular embodiment of the present invention, the sensing system may further comprise a second optical baffle tube positioned adjacent an opposite one of the laser signal transmission and reception lenses, with the second optical baffle tube having a second plurality of internal baffle rings operative to attenuate off-axis laser light emitted or received respectively from the opposite one of the laser signal transmission or reception lenses.

Still further disclosed herein is an optical baffle for use in conjunction with a laser sensor. The optical baffle comprises an elongate substantially tubular structure having proximal and distal ends thereof. A plurality of spaced apart annular baffle rings are disposed along a length of an interior of the substantially tubular structure. The proximal and distal ends of the structure are respectively disposed adjacent the laser sensor and an object toward which the laser sensor is directed.

Additionally further disclosed herein is a sensing system for determining a distance to a surface detectable through a length of pipe which comprises a laser sensor having laser signal transmission and reception lenses thereof and operative to measure a time-of-flight distance of laser light between the laser sensor and the surface. A first optical baffle tube is positioned adjacent either one of the laser signal transmission and reception lenses, with the first optical baffle tube having a plurality of internal baffle rings operative to attenuate off-axis laser light emitted or received respectively from either one of the laser signal transmission or reception lenses.

In a more particular embodiment of the present invention a second optical baffle tube is positioned adjacent an opposite one of the laser signal transmission and reception lenses, with the second optical baffle tube having a second plurality of internal baffle rings operative to attenuate off-axis laser light emitted or received respectively from the opposite one of the laser signal transmission or reception lenses.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF A REPRESENTATIVE EMBODIMENT

Figure 1:
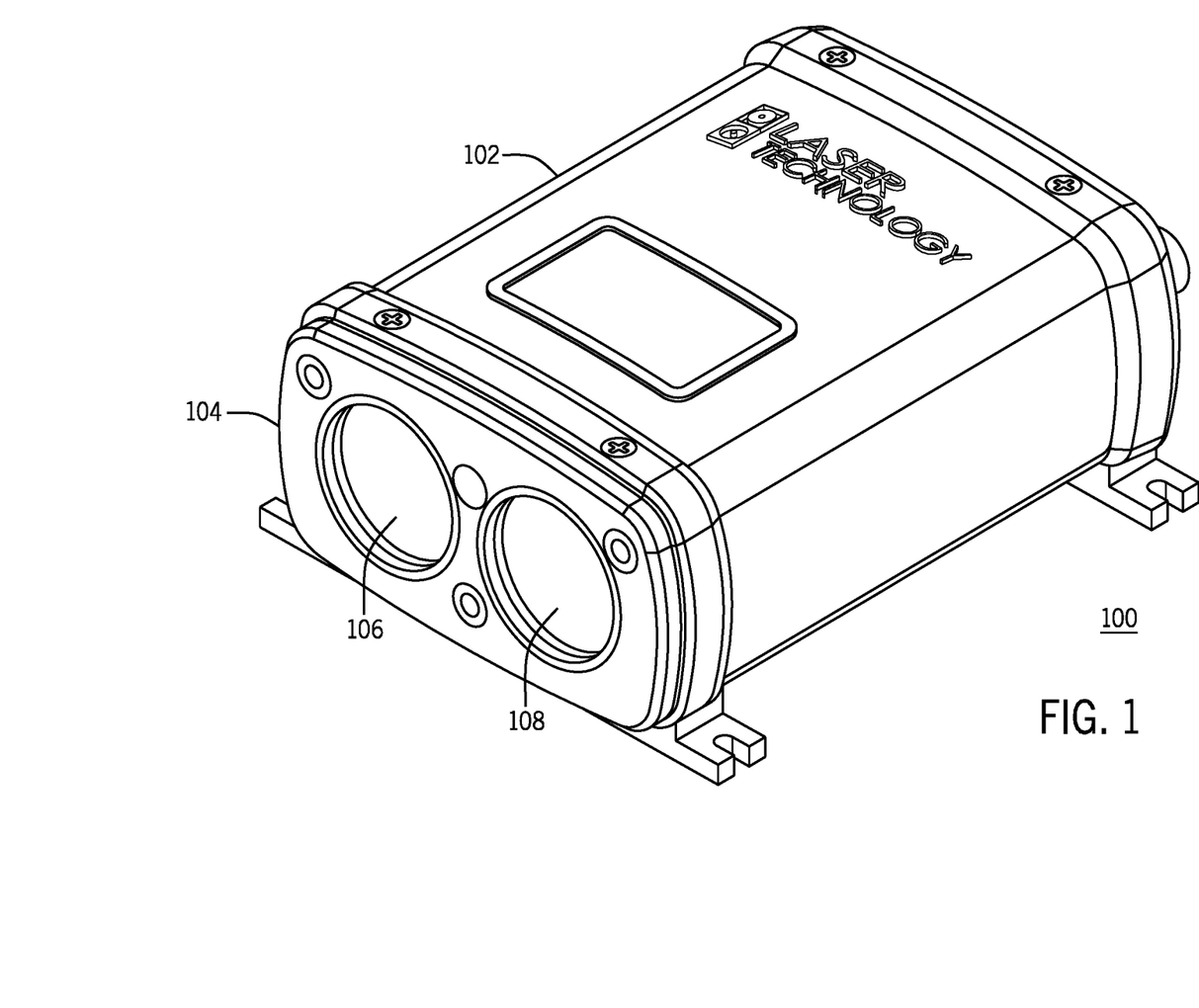
FIG. 1 is an upper left side isometric view of a representative laser sensor for utilization in conjunction with the optical baffle of the present invention.

With reference now to FIG. 1, an upper left side isometric view of a representative laser sensor 100 for utilization in conjunction with the optical baffle of the present invention is shown. The laser sensor 100 illustrated may be conveniently sourced as a Laser Technology, Inc. Series S3xx device such as an S330 laser sensor. Such a device comprises a housing 102 having a face plate 104 having respective apertures for a transmit lens 106 and corresponding receive lens 108 as shown. A detailed description of this and other laser sensors may be found at: https://www.lasertech.com/Laser-Sensors.aspx With reference additionally now to FIG. 2, an elevational view of an assembly of two optical baffle tubes 200 is shown affixed in a mounting plate 202 for attachment to the face plate 104 of a laser sensor 100 such as the one illustrated in the preceding figure is shown. In this exemplary embodiment, the assembly 200 comprises a TX baffle tube 206 and a corresponding RX baffle tube 204. The mounting plate 202 as well as the baffle tubes 204, 206 may be conveniently 3D printed using glycol modified polyethylene terephthalate (PETG) with the mounting plate 202 configured to be advantageously mounted in a TruCapture® (a registered trademark of Laser Technology, Inc.) lens plate part number 1157843.

Figure 3:
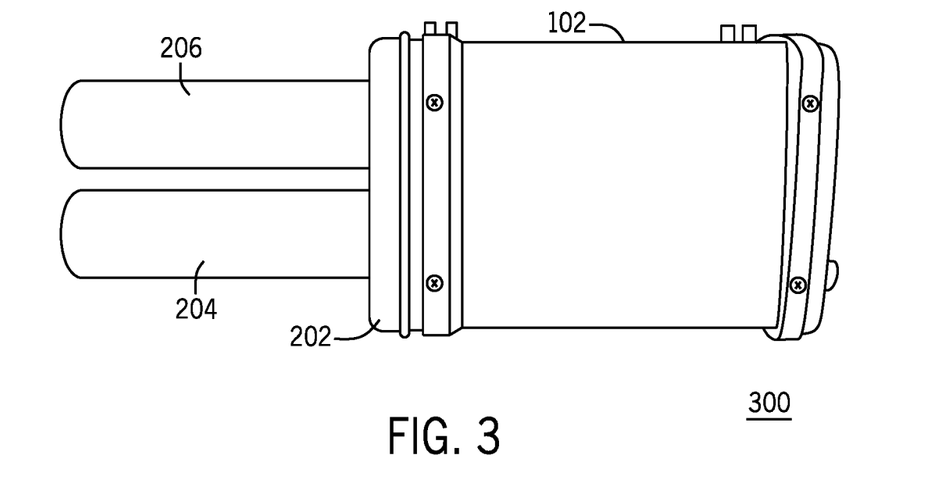
FIG. 3 is a top plan view of the assembly of optical baffle tubes of the preceding figure as affixed to the representative laser sensor of FIG. 1.

With reference additionally now to FIG. 3, a top plan view of the assembly 200 of the preceding figure is shown as affixed to the representative laser sensor 100 of FIG. 1; these components in combination together comprising a liquid level sensing system 300 in accordance with the principle of the present invention.

Figure 2:
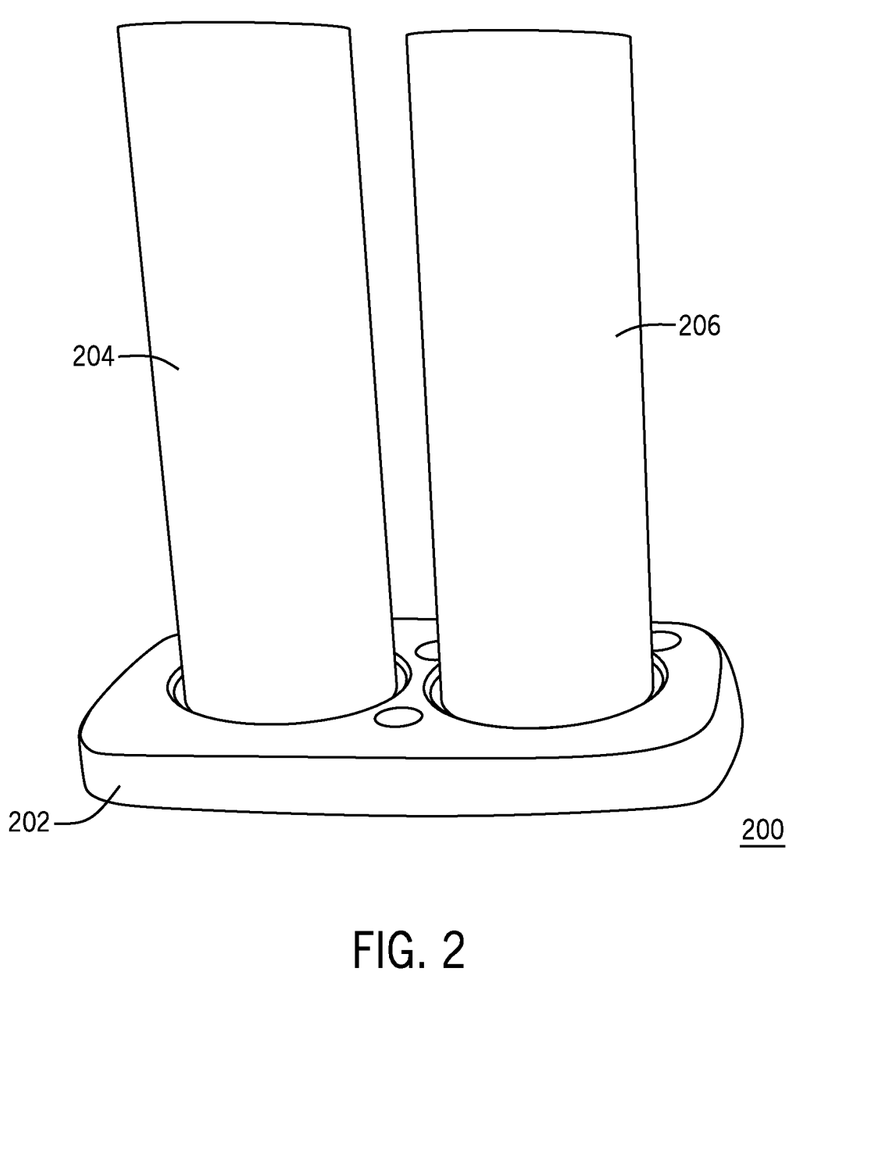
FIG. 2 is an elevational view of an assembly comprising a pair of optical baffle tubes affixed in a mounting plate for attachment to the front surface of a laser sensor such as the one illustrated in the preceding figure.
Figure 4:
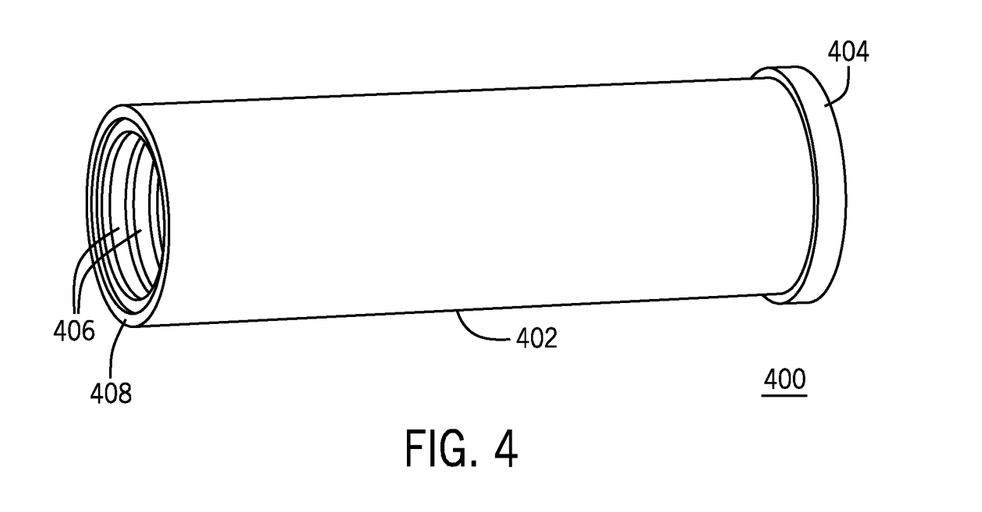
FIG. 4 is an isometric view of one of the pair of optical baffle tubes of FIGS. 2 and 3 and illustrating a portion of the plurality of internal concentric and spaced apart baffle rings extending from a proximal flange portion to a distal end thereof.

With reference additionally now to FIG. 4, an isometric view of one of the pair of optical baffle tubes 400 of FIGS. 2 and 3 is shown illustrating its outer surface 402 along its length and a portion of the plurality of internal concentric and spaced-apart baffle rings 406 extending from a proximal flange 404 to a distal end 408 thereof. The flange 404 facilitates the mounting of the baffle tube 400 within the mounting plate 202.

Figures 5A, 5B:
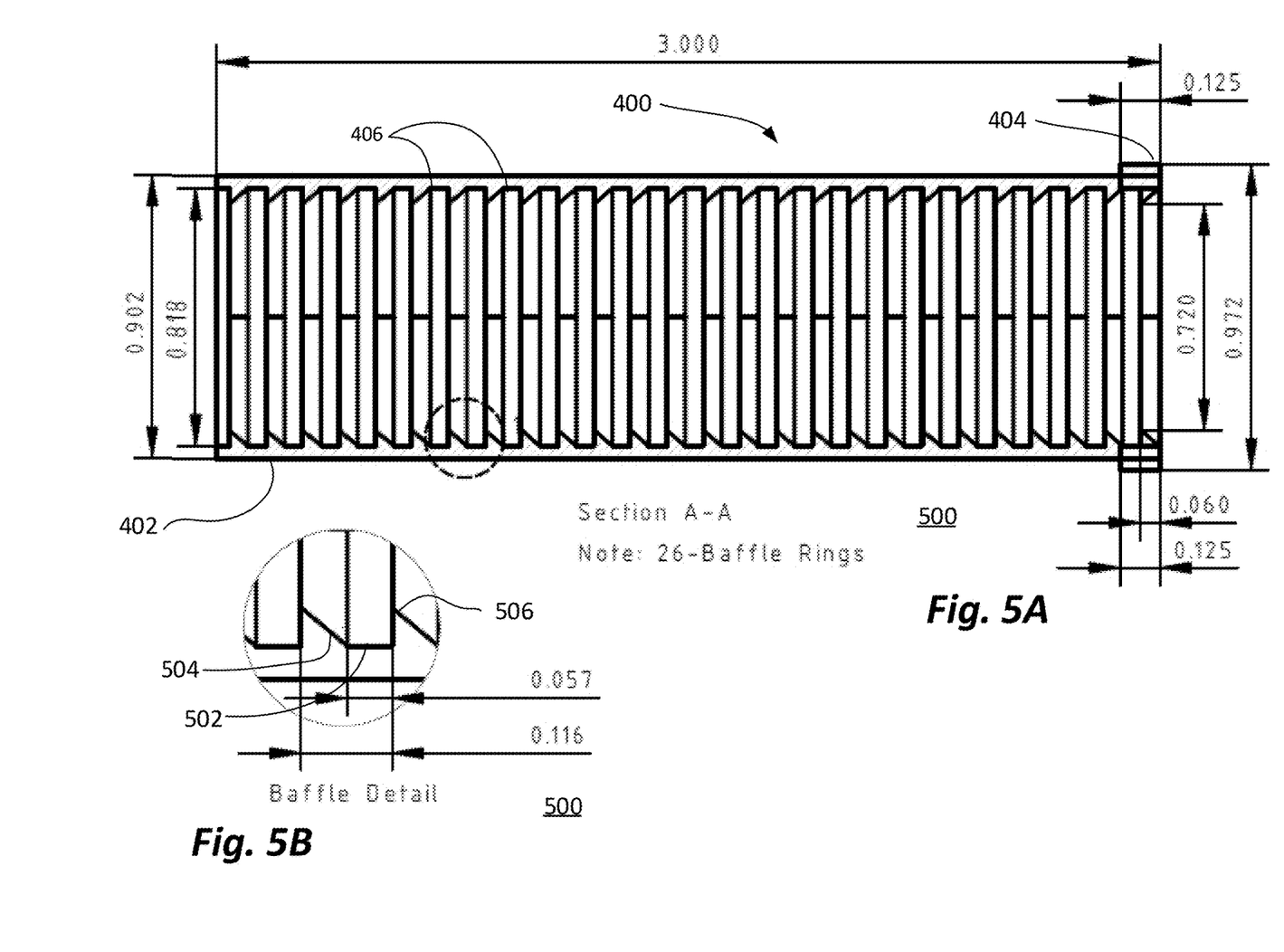
FIG. 5A is a cut-away, side elevational view of the optical baffle tube of the preceding figure illustrative of representative dimensions and number of constituent baffle rings in an exemplary embodiment of the optical baffle of the present invention.
FIG. 5B is an enlarged view of an exemplary profile of some of the baffle rings indicated in the preceding figure.

With reference additionally now to FIG. 5A, a cut-away, side elevational view of an embodiment 500 of the optical baffle tube 400 of the preceding figure is shown illustrative of representative dimensions and the possible number of constituent baffle rings in an exemplary embodiment of the optical baffle of the present invention. Structure previously described with respect to the preceding figures has been like numbered and the foregoing description shall suffice herefor.

With reference additionally now to FIG. 5B, an enlarged view of an exemplary profile of some of the baffle rings 406 indicated in the preceding figure is shown. The baffle rings 406 are illustrated as each extending from an inner surface 502 of the baffle tube 400 as an angularly disposed surface 504 to a point 506 and thence back perpendicularly to the inner surface 502. In the representative and exemplary embodiment 500 illustrated, a 3 inch baffle tube 400 might comprise 26 baffle rings with the hypotenuse of each triangular cross section baffle ring 406 facing toward the flange 404 for both the TX and RX lenses 106, 108.

For ease of 3D fabrication, the baffle tubes 204, 206 (FIGS. 2 and 3) may be made to be identical. In other specific applications the TX baffle tube may alternatively be constructed with the hypotenuse of each triangular cross section baffle ring extending toward the distal end 408 of the baffle tube.

Figure 5C:
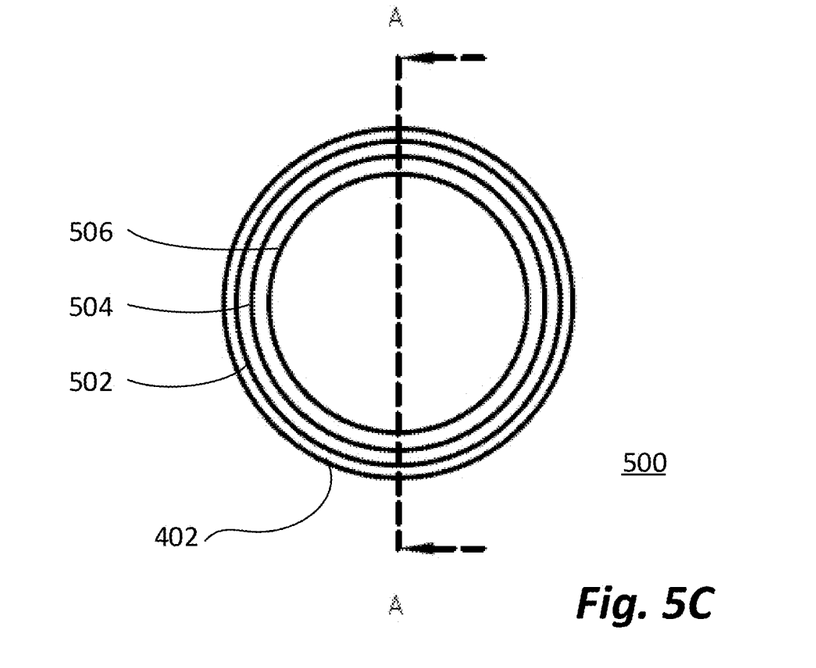
FIG. 5C is an end plan view of the optical baffle tube illustrated in FIG. 5A taken substantially along section line A-A thereof.

With reference additionally now to FIG. 5C, an end elevational view of the optical baffle tube 400 illustrated in FIG. 5A is shown as taken substantially along section line A-A thereof.

Figure 5D:
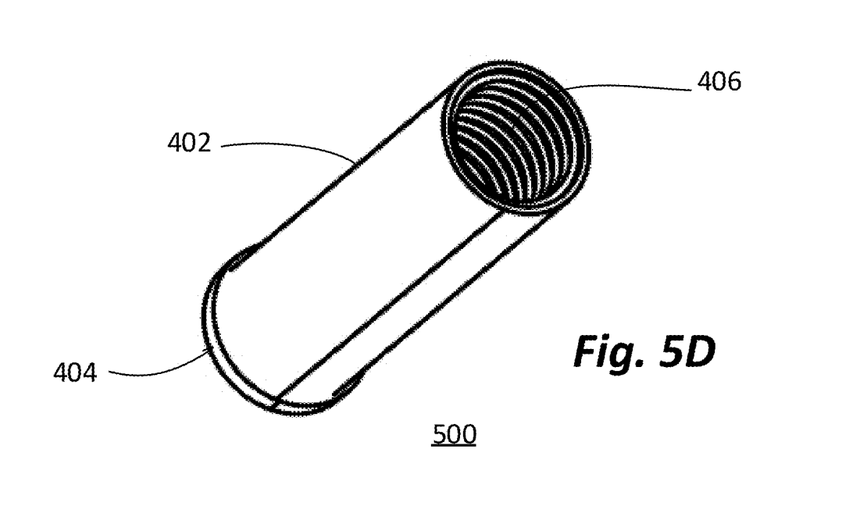
FIG. 5D is a lower right side isometric view of the optical baffle tube of FIGS. 5A to 5C.

With reference additionally now to FIG. 5D, a lower right side isometric view of the optical baffle tube 400 of FIGS. 5A to 5C is shown.

Figure 6:
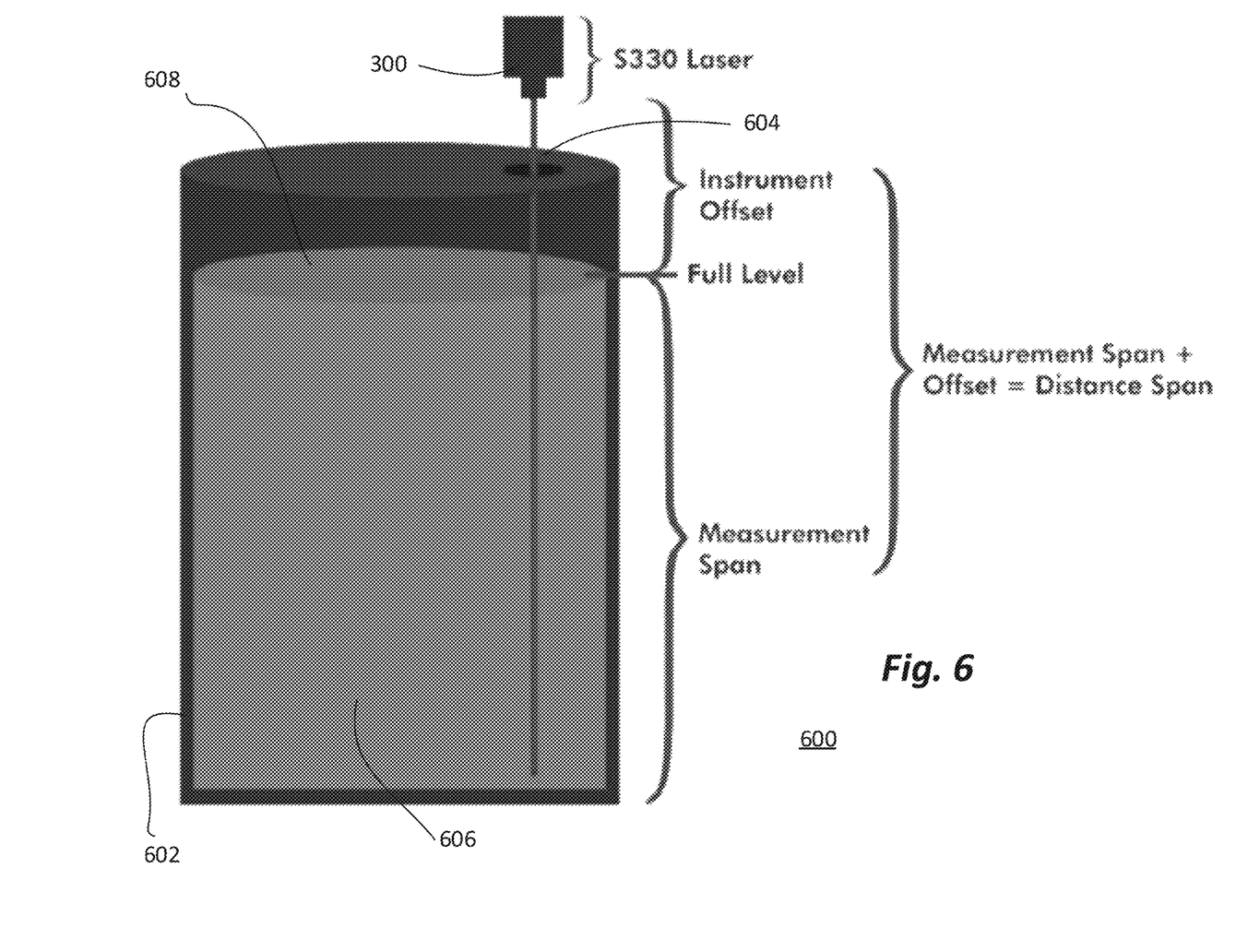
FIG. 6 is a simplified representative utilization of the combination of a laser sensor employing one or more optical baffle tubes as disclosed herein in an application for measuring the height of a liquid surface.

With reference additionally now to FIG. 6, a simplified representative utilization 600 of the combination of a laser sensor employing one or more optical baffle tubes as disclosed herein is illustrated in an application for measuring the height of a liquid level. A liquid level sensing system 300 (as previously shown and described with respect to FIG. 3)

is positioned above a liquid 606 through an opening 604 in a tank 602 in order to measure the height 608 of the liquid 606.

Figure 7:
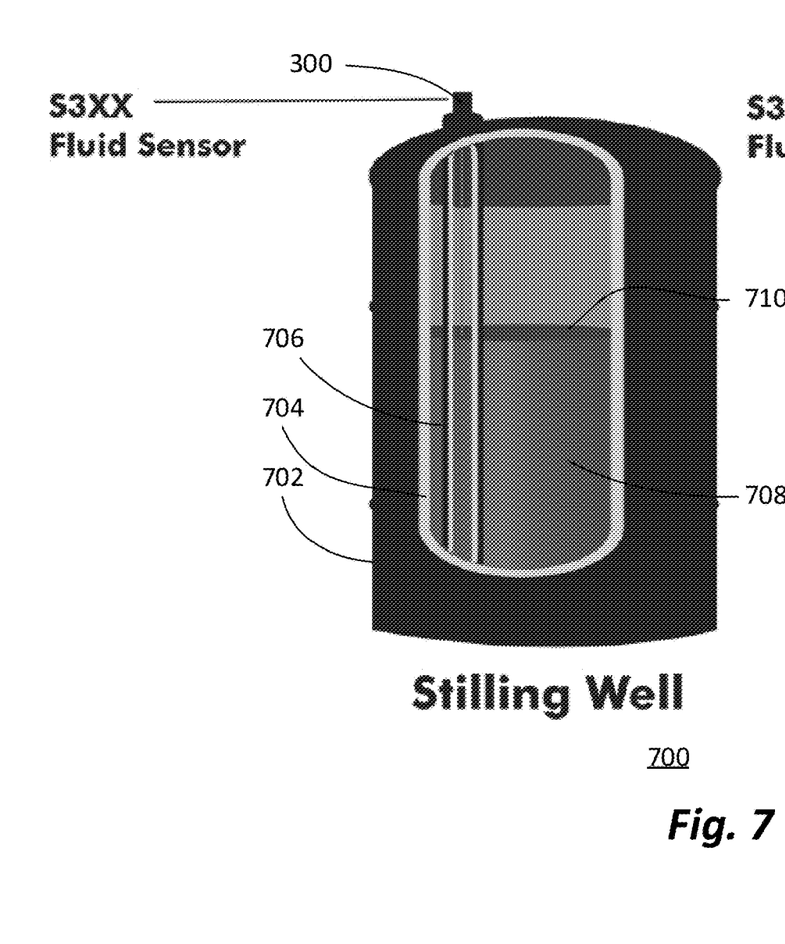
FIG. 7 is a further simplified representative utilization of the combination of a laser sensor employing one or more optical baffle tubes as disclosed herein in an application for measuring the height of a liquid surface in a stilling well.

With reference additionally now to FIG. 7, a further simplified representative utilization 700 of the combination of a laser sensor employing one or more optical baffle tubes as disclosed herein is illustrated in an application for measuring the height of a liquid surface in a stilling well. In this possible application, a liquid level sensing system 300 (as previously shown and described with respect to FIG. 3) is positioned above a liquid 708 as contained within a stilling tube 706. The stilling tube 706 is in communication with the liquid 708 as maintained within a container 704 within a larger tank 702 in order to measure the height 710 of the liquid 708.

Figure 8:
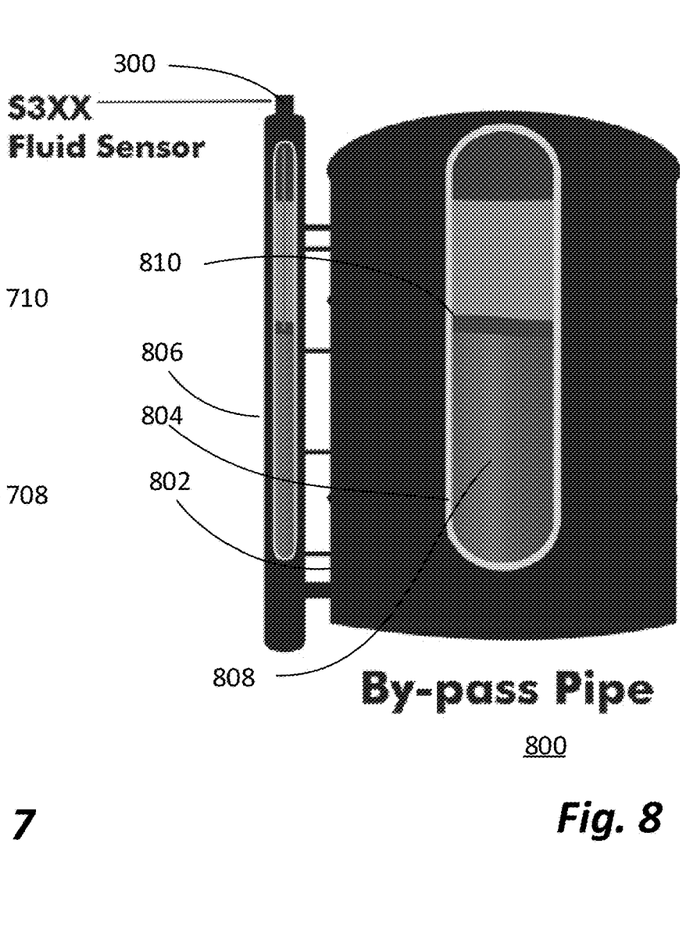
FIG. 8 is an additional simplified representative utilization of the combination of a laser sensor employing one or more optical baffle tubes as disclosed herein in an application for measuring the height of a liquid surface in a by-pass pipe.

With reference additionally now to FIG. 8, an additional simplified representative utilization 800 of the combination of a laser sensor employing one or more optical baffle tubes as disclosed herein is illustrated in an application for measuring the height of a liquid surface in a by-pass pipe. In this instance a liquid level sensing system 300 (as previously shown and described with respect to FIG. 3) is positioned above a liquid 808 maintained within a chamber 804 within a tank 802. The liquid in a by-pass pipe 806 is in communication with the liquid in the chamber 804 such that the liquid level sensing system 300 can determine the height 810 of the liquid 808.

While there have been described above the principles of the present invention in conjunction with one or more specific optical baffle tube configurations and structures and associated laser sensors it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A sensing system for determining a liquid level comprising:
    a laser sensor having laser signal transmission and reception lenses thereof and operative to measure a time-of-flight distance of laser light between said laser sensor and said liquid level; and
    a first optical baffle tube positioned adjacent either one of said laser signal transmission and reception lenses, said first optical baffle tube having a plurality of internal baffle rings operative to attenuate off-axis laser light emitted or received respectively from said either one of said laser signal transmission or reception lenses.

2. The sensing system of claim 1 further comprising:
    a second optical baffle tube positioned adjacent an opposite one of said laser signal transmission and reception lenses, said second optical baffle tube having a second plurality of internal baffle rings operative to attenuate off-axis laser light emitted or received respectively from said opposite one of said laser signal transmission or reception lenses.

3. The sensing system of claim 2 wherein said first and second optical baffle tubes are disposed within a stilling pipe.

4. The sensing system of claim 2 wherein said first and second optical baffle tubes are disposed within a by-pass pipe.

5. The sensing system of claim 2 wherein said first and second optical baffle tubes comprise PETG material.

6. The sensing system of claim 2 wherein said first and second optical baffle tubes comprise structurally similar baffle rings.

7. The sensing system of claim 6 wherein said baffle rings of said first and second optical baffle tubes comprise spaced apart annular rings having a triangular cross-section.

8. The sensing system of claim 2 wherein said first and second optical baffle tubes are substantially 3 inches in length and have an internal diameter of substantially 0.72 inches.

9. The sensing system of claim 2 wherein said first and second optical baffle tubes comprise a flange at proximal ends thereof for mounting said baffle tubes adjoining said laser signal transmission and reception lenses respectively.

10. The sensing system of claim 1 wherein said laser sensor comprises an S300 series laser sensor.

11. A sensing system for determining a distance to a surface detectable through a length of pipe comprising:
    a laser sensor having laser signal transmission and reception lenses thereof and operative to measure a time-of-flight distance of laser light between said laser sensor and said surface; and
    a first optical baffle tube positioned adjacent either one of said laser signal transmission and reception lenses, said first optical baffle tube having a plurality of internal baffle rings operative to attenuate off-axis laser light emitted or received respectively from said either one of said laser signal transmission or reception lenses.

12. The sensing system of claim 11 further comprising:
    a second optical baffle tube positioned adjacent an opposite one of said laser signal transmission and reception lenses, said second optical baffle tube having a second plurality of internal baffle rings operative to attenuate off-axis laser light emitted or received respectively from said opposite one of said laser signal transmission or reception lenses.

13. The sensing system of claim 11 wherein said length of pipe comprises a stilling pipe.

14. The sensing system of claim 11 wherein said length of pipe comprises a by-pass pipe.

15. The sensing system of claim 12 wherein said length of pipe comprises a stilling pipe.

16. The sensing system of claim 12 wherein said length of pipe comprises a by-pass pipe.

17. The sensing system of claim 12 wherein said first and second optical baffle tubes comprise PETG material.

18. The sensing system of claim 12 wherein said first and second optical baffle tubes comprise structurally similar baffle rings.

19. The sensing system of claim 18 wherein said baffle rings of said first and second optical baffle tubes comprise spaced apart annular rings having a triangular cross-section.

20. The sensing system of claim 12 wherein said first and second optical baffle tubes are substantially 3 inches in length and have an internal diameter of substantially 0.72 inches.

21. The sensing system of claim 12 wherein said first and second optical baffle tubes comprise a flange at proximal ends thereof for mounting said baffle tubes adjoining said laser signal transmission and reception lenses respectively.

22. The sensing system of claim 11 wherein said laser sensor comprises an S300 series laser sensor.

\* \* \* \* \*